US006834622B2

(12) United States Patent
Griffin et al.

(10) Patent No.: US 6,834,622 B2
(45) Date of Patent: Dec. 28, 2004

(54) METHOD FOR GENERATING STEAM, IN PARTICULAR ULTRAPURE STEAM, AND STEAM GENERATOR

(75) Inventors: Timothy Griffin, Ennetbaden (CH); Andreas Schlegel, Zurich (CH); Dieter Winkler, Lauchringen (DE)

(73) Assignee: ALSTOM Technology LTD, Baden (CH)

( * ) Notice: Subject to any disclaimer, the term of this patent is extended or adjusted under 35 U.S.C. 154(b) by 0 days.

(21) Appl. No.: 10/662,376

(22) Filed: Sep. 16, 2003

(65) Prior Publication Data

US 2004/0069245 A1 Apr. 15, 2004

(30) Foreign Application Priority Data

Sep. 17, 2002 (DE) ......................................... 102 43 250

(51) Int. Cl.[7] ................................................ F22D 1/00
(52) U.S. Cl. ...................................... 122/438; 122/404
(58) Field of Search ............................... 60/39.826, 723; 122/5.52, 40, 390, 404, 405, 436, 438, 442; 431/4, 158, 7, 170; 432/26, 219

(56) References Cited

U.S. PATENT DOCUMENTS

| | | | | |
|---|---|---|---|---|
| 4,397,356 A | * | 8/1983 | Retallick | 166/303 |
| 4,789,488 A | | 12/1988 | deSilva | 210/750 |
| 5,758,605 A | * | 6/1998 | Calkins | 122/31.1 |
| 5,946,917 A | * | 9/1999 | Hums et al. | 60/723 |
| 6,637,379 B2 | * | 10/2003 | Hays et al. | 122/40 |

FOREIGN PATENT DOCUMENTS

| | | |
|---|---|---|
| DE | 2042364 | 6/1971 |
| DE | 35 12 947 A1 | 10/1986 |
| DE | 29 20 233 C2 | 4/1989 |
| DE | 35 12 948 C2 | 4/1989 |
| DE | 39 36 806 A1 | 5/1991 |
| GB | 1048276 | 11/1966 |

OTHER PUBLICATIONS

Search Report from DE 102 43 250.3 (Apr. 22, 2003).

* cited by examiner

*Primary Examiner*—Gregory Wilson
(74) *Attorney, Agent, or Firm*—Cermak & Kenealy LLP; Adam J. Cermak

(57) ABSTRACT

Method for generating steam, in particular ultrapure steam, and steam generator

The invention relates to a method and a steam generator for generating steam, in particular ultrapure steam, by reacting a stoichiometric mixture comprising a fuel, in particular hydrogen, and an oxidizing agent, in particular oxygen, and injecting water into the hot reaction gases, which is distinguished by a high purity of the steam generated.

The object of providing a method for generating an ultrahigh purity steam is achieved, according to the invention, by two-stage combustion, in that the reaction mixture which is generated in a first combustion and evaporation stage is subjected to catalytic afterburning.

A steam generator is distinguished by the fact that a catalytic afterburning chamber (3) with a through-flow body (16) is arranged downstream of the combustion and evaporation chamber (2).

23 Claims, 3 Drawing Sheets

METHOD FOR GENERATING STEAM, IN PARTICULAR ULTRAPURE STEAM, AND STEAM GENERATOR

BACKGROUND OF THE INVENTION

1. Field of the Invention

The invention relates to a method for generating steam, in particular ultrapure steam, by reacting a stoichiometric mixture comprising a hydrogen-containing fuel and an oxidizing agent in a combustion chamber and injecting water into the hot reaction gases. In addition, the invention also relates to a steam generator for generating steam, in particular ultrapure steam.

2. Discussion of Background

In numerous technical application areas there is a need to provide steam with different temperature and pressure parameters.

For a range of applications in medical technology, food technology or experimental physics or chemistry, there is a need to provide steam in a very high level of purity within a very wide temperature and pressure range.

In addition to the conventional method of generating steam by boiling and evaporating water with subsequent superheating, it is also known to burn a stoichiometric mixture of hydrogen and oxygen in a combustion chamber and to inject water into the hot reaction gas so that it evaporates. In this way, very hot steam at very high pressures within a range of up to theoretically 3000 K and up to several hundred bar can be produced, unlike in conventional evaporation methods.

However, there are limits to this technology, as disclosed for example in DE 3512947 and DE 3936806, with regard to the purity of the steam which is generated. According to this method, the provision of steam of a very high level of purity requires virtually complete reaction of the starting materials hydrogen and oxygen which participate in the reaction. However, a problem in this respect is that, in view of the very high reaction temperatures, the additional water has to be injected directly into the combustion chamber, leading to local disruptions to the combustion operation, so that the reaction of the starting materials does not completely finish and the steam which is generated still contains a proportion of 20% to 30% of unreacted starting substances hydrogen and oxygen.

For many applications, in particular experimental physics, such a high level of unburnt substances cannot be tolerated.

Now, although it is obvious to take special process measures, for example relating to the injection of the water into the hot gases, to attenuate this quenching effect to some extent and thereby to achieve a higher degree of conversion in the oxidation reaction, nevertheless the steam which is generated in many cases, for example for the testing of combustion sequences under steam atmosphere, does not satisfy the extremely high purity levels required, meaning that many potential application areas of the use of ultrapure steam remain out of reach to this technology.

SUMMARY OF THE INVENTION

Accordingly, one object of the invention is to provide a novel method for generating steam of a very high purity which can be varied within a very wide pressure and temperature range.

Furthermore, the invention is based on the object of providing a steam generator which can be produced at low investment cost and which ensures complete conversion of the reaction mixture under all conditions.

According to the invention, the object is achieved by a method and a steam generator of the type described in the independent claims 1 and 11, respectively. Advantageous embodiments are given in the dependent claims.

The basic idea of the invention consists in configuring the exothermic reaction for providing the evaporation and superheating heat as a two-stage process in order to ensure complete conversion of the starting materials.

This is advantageously achieved with the aid of a method for generating steam, in particular ultrapure steam, by exothermic reaction of a fuel and an oxidizing agent, followed by cooling by the addition of water, by virtue of the fact that the hot steam-containing reaction mixture is subjected to catalytic afterburning downstream of the reaction and evaporation zone. In a preferred embodiment, the reaction mixture flows through a gas-permeable structure (referred to below as the through-flow body), which is equipped with a catalytically active surface, for example platinum.

To generate ultrapure steam, the preferred oxidizing agent is oxygen and the preferred fuel is hydrogen. Hydrogen peroxide is recommended as an alternative oxidizing agent. This applies in particular with regard to those applications of the ultrapure steam which is generated which are intended to reliably exclude even the slightest trace of oxygen.

For those applications of the steam which is generated in which a proportion of inert components is permissible in the steam, according to the invention the fuel hydrogen can be completely or partially replaced by gaseous or liquid hydrocarbons, in particular by natural gas, and the oxidizing agent oxygen can be completely or partially replaced by oxygen-enriched air.

To monitor the functioning and efficiency of the method, a lambda sensor for recording the oxygen content is connected downstream of the catalytic afterburning stage.

A steam generator for generating steam, in particular ultrapure steam, at least comprising a combustion and evaporation chamber having a reaction zone for the exothermic reaction of the fuel and an oxidizing agent and having an evaporation zone for evaporation and/or superheating of a quantity of water injected into the hot reaction gases is distinguished by the fact that a catalytic afterburning chamber is arranged downstream of the combustion and evaporation chamber.

In a preferred configuration, the catalytic afterburning chamber is designed as a cylindrical tube, the free cross section of flow of which is acted on, over a region of its axial length, by a through-flow body with a catalytically active surface.

In a particularly preferred embodiment, the through-flow body is based on a foamed metal material or a foamed ceramic material as substrate.

Alternatively, honeycomb-like or similar multicelled structures also achieve good results, provided that they offer a sufficient active surface area to the reaction gases flowing through.

The catalyst is in this case applied to the substrate as a coating or, in the case of a porous surface of the substrate, is incorporated therein.

In an expedient addition to the invention, the afterburning chamber comprises a double-casing tube which has cooling passages for indirect cooling by means of a fluid flowing through.

To prevent the formation of condensate at the chamber wall, it has proven expedient to use a gaseous cooling medium.

With the aid of the invention, it is now possible to generate steam of a very high level of purity, i.e. with a purity of over 99.9%, with relatively little technical outlay.

The ability to generate such a pure steam mixture, in conjunction with the high flexibility of the steam generator with regard to the process parameters throughput, temperature and pressure open up new potential application areas in research and industry, for example the testing of combustion processes under a steam atmosphere, the treatment of special waste or technology related to emission-free energy conversion, to the technology of superheated high-purity steam.

On account of its modular structure, the steam generator according to the invention can be matched to the requirements of different applications with little outlay on apparatus. It requires little maintenance, is environmentally friendly and is distinguished by low investment costs and low operating costs. It can be produced both on a large industrial scale and for applications on a laboratory scale.

In addition to the simple structure, the high flexibility with regard to the process and capacity parameters throughput, pressure and temperature and the availability of the installation should also be emphasized.

The steam generator is suitable for continuous operation, on account of its short response times, but in particular is also suitable for intermittent operation, since it reaches a steady operating state within a very short time of ignition. The response times to changes in the process parameters are extremely short.

A further advantage resides in the possibility of using a commercially available lambda sensor for the gas analysis.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
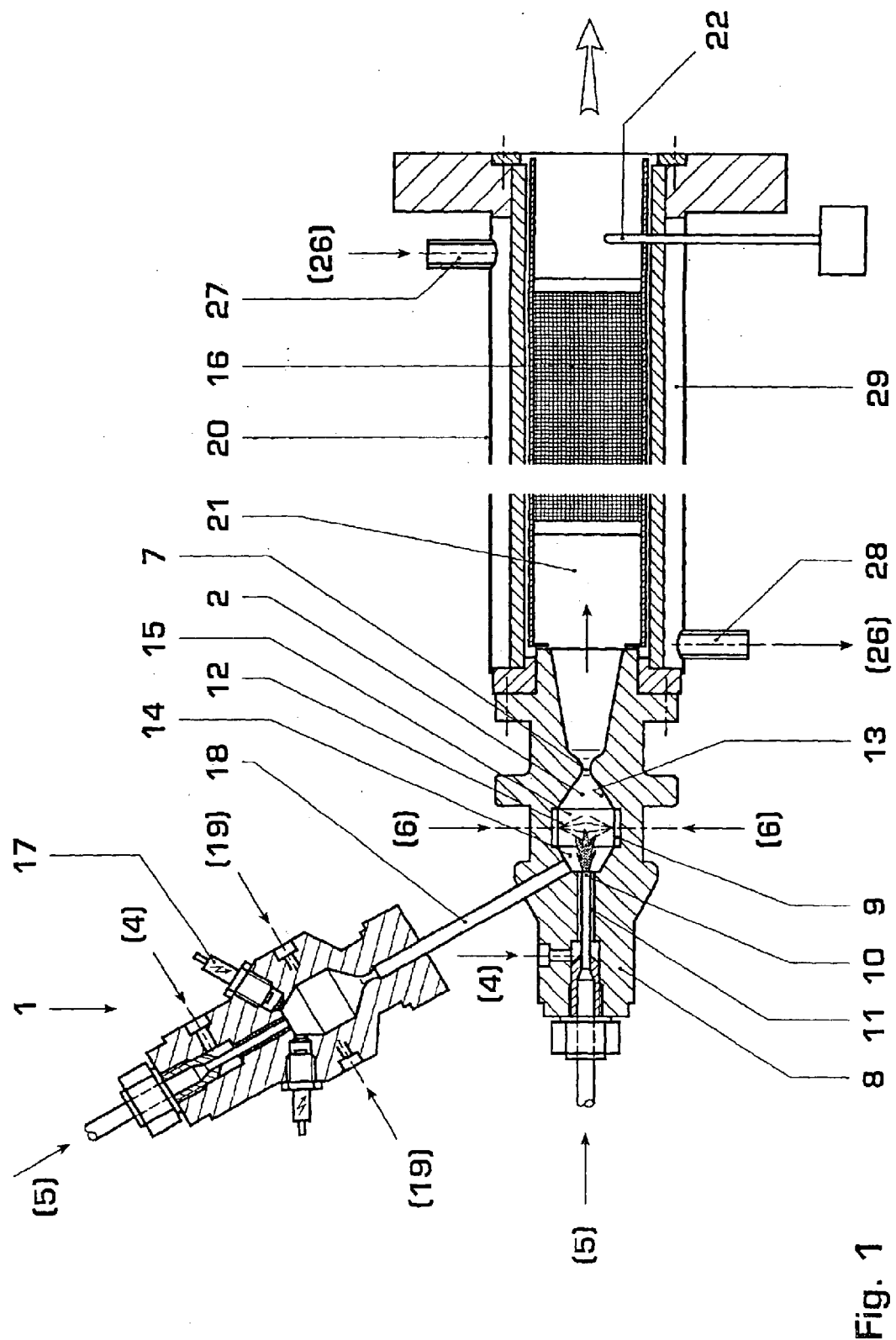
FIG. 1 diagrammatically depicts a steam generator.

Referring now to the drawings, wherein like reference numerals designate identical or corresponding parts throughout the several views and wherein only the elements which are pertinent to the invention are illustrated, FIG. 1 provides a highly diagrammatic illustration of the basic structure of a steam generator according to the invention, substantially comprising the three main components, which are assembled in modular form, pilot ignition chamber (1), combustion and evaporation chamber (2) with reaction zone (14), evaporation zone 15 and outlet nozzle (7), and catalytic afterburning chamber (3). The figure also illustrates the feed devices for supplying a fuel (4), an oxidizing agent (5) and water (6).

A housing shell (8) surrounds a substantially rotationally symmetrical combustion and evaporation chamber (2). At an end side which lies upstream in the operating state, the combustion and evaporation chamber (2) has concentric inlet openings (10; 11) for the fuel (4) and the oxidizing agent (5). A configuration of the concentric inlet openings (10; 11) which is favorable with a view to achieving a stoichiometric combustion operation comprises an inner cylindrical opening (10) for the oxidizing agent and an outer annular opening (11) for the fuel.

At a second, downstream end side, the reaction and evaporation chamber (2) has a steam outlet with a nozzle-like narrowing (7).

At an axial distance downstream of the first end side, the combustion chamber wall (13) has a number of intake openings (12) which are distributed over the circumference, for the water (6) which is to be evaporated. The intake openings (12) may in this case be arranged in one or more axial planes; in the latter case the inlet openings (12) of different levels may be arranged offset with respect to one another. It is by no means imperative for the inlet openings (12) to be arranged perpendicular to the profile of the inner contour (13) of the evaporation zone (15). In order on the one hand to achieve uniform loading of the hot reaction gases and intimate mixing and on the other hand to exert a cooling action on the housing inner wall (13) at least in the region of the evaporation zone (15), the inlet openings (12) may penetrate through the wall (13) inclined in either the radial direction or the axial direction.

For cooling purposes, the housing shell (8) is equipped with passages (9) for a cooling medium. According to an expedient embodiment of the invention, these cooling passages (9), completely or in part, may be acted on by the water (6) which is to be introduced into the combustion and evaporation chamber (2) and can therefore be used to preheat the water which is to be evaporated, if appropriate also forming a two-phase mixture or as far as beyond the evaporation point. This increases the efficiency, in that the thermal energy which is dissipated is returned to the process.

At the exit from the combustion and evaporation chamber (2), the cross section of flow narrows to form an outlet nozzle (7), in which the reaction mixture flowing out is considerably accelerated, preferably to a flow velocity which is above the speed of sound.

This measure results in various effects. Firstly, the throttle point (7) builds up the pressure in the combustion and the evaporation chamber (2). Moreover, a barrier is created in order to decouple the combustion and evaporation chamber (2) from pressure fluctuations in downstream installations, in particular the downstream steam consumer, so that such fluctuations do not disturb the reaction zone and/or lead to fluctuations in the reaction rate or the like, and finally, the acceleration and subsequent deceleration promote the homogenization of the phases of the reaction mixture. The cross section of flow widens out again continuously or in a number of steps toward the afterburning chamber (3), in order to decelerate the reaction mixture to a flow velocity which is suitable for passing through the catalytically active through-flow body (16) and initiating a catalytic oxidation reaction.

The pilot combustion chamber (1) is connected to the combustion and evaporation chamber (2). It comprises feed devices for the fuel (4) and the oxidizing agent (5) and also an electrical ignition device (17) for igniting the mixture and a lance (18) for introducing the ignited hot gases into the reaction zone (14) of the combustion and evaporation chamber (2). Furthermore, it accommodates feed devices for inert constituents (19) for purging the installation before it is started up and after it has been shut down.

The afterburning chamber (3) substantially comprises a rotationally symmetrical housing (20) in the form of a double-casing tube having a gas-permeable through-flow body (16) which acts on the entire free cross section of flow

(21) and has a catalytically active surface, for example based on a substrate made from foamed metal material with a platinum surface.

In principle, all materials which promote the combustion operation, such as precious metals (Pd, Pt, Rh, etc.), metal oxides ($MnO_2$, NiO, etc.), alone or mixed with a co-catalyst, are suitable for use as the catalyst.

Although in principle a wide range of thermally stable metallic and ceramic materials which are known per se are suitable for use as substrate for this intended purpose, metallic materials are best able to satisfy the requirements relating to reduction of vibrations and support properties for catalysts. Good results have been achieved using materials based on aluminum-containing or aluminum-treated iron or steel alloys. If these materials contain a sufficiently high level of aluminum, aluminum whiskers are formed on the surface during the oxidation, allowing a rough, chemically active surface to be formed, which is especially suitable as a support for catalytically active coating material.

According to an alternative favorable embodiment, the metallic substrate is a woven steel fabric which is coated with a porous ceramic material which contains the catalyst material.

The through-flow body (16) can be connected to the surrounding housing wall in any suitable way. A wide range of options are open to the person skilled in the art depending on the specific conditions in the particular application.

It has been found that the structure body (16) extending across the entire cross section damps pressure waves and thereby makes an additional contribution to minimizing the effects of pressure waves from downstream installations on the reaction zone and suppressing fluctuations in the reaction rate.

To monitor the correct functioning of the steam generator, a gas-analysis device (22) for recording the oxygen content is arranged downstream of the through-flow body (16), inside the afterburning chamber.

The invention allows a commercially available lambda sensor (22) to be used for this purpose. This is an important benefit, allowing simple, tried-and-tested technology to be employed. A lambda sensor (22) for physical reasons reacts more sensitively to hydrogen than to oxygen. Therefore, their use is out of the question with conventional technology, since an effective excess of oxygen would be covered up by the presence of hydrogen and would thereby lead to unusable results.

According to a first embodiment for applications providing steam at substantially atmospheric pressure, the lambda sensor (22) is arranged in the flow passage (21) in a manner known per se, so that the flowing reaction mixture flushes around it.

Figure 2:
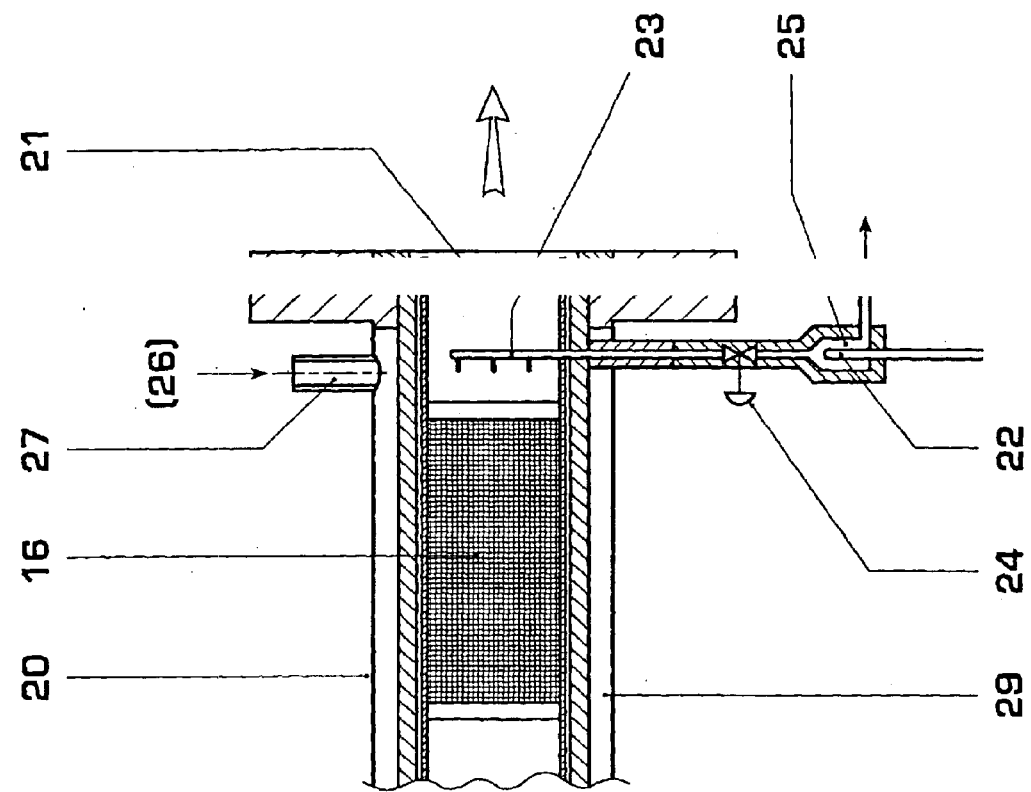
FIG. 2 shows an arrangement of a lambda sensor in the afterburning chamber.

Since lambda sensors are not suitable for use under excess-pressure conditions, an alternative embodiment presented in FIG. 2 provides for a removal pipe (23) to be introduced into a through-opening in the housing wall (20) of the afterburning chamber (3), which removal pipe (23) is designed to be gas-permeable toward the flow passage (21) and outside the housing shell (20) is in communication, via a pressure-relief device, such as a pressure-reducing valve (24), with a chamber (25) which accommodates the lambda sensor (22).

The housing (20) of the afterburning chamber (3) is indirectly cooled. To prevent the formation of condensate at the inner wall, the casing cooling is preferably performed using a gaseous cooling medium (26), in particular air, which flows through a cooling passage (29). Suitable feed and discharge connection pieces (27; 28) are installed at suitable positions.

Figure 3:
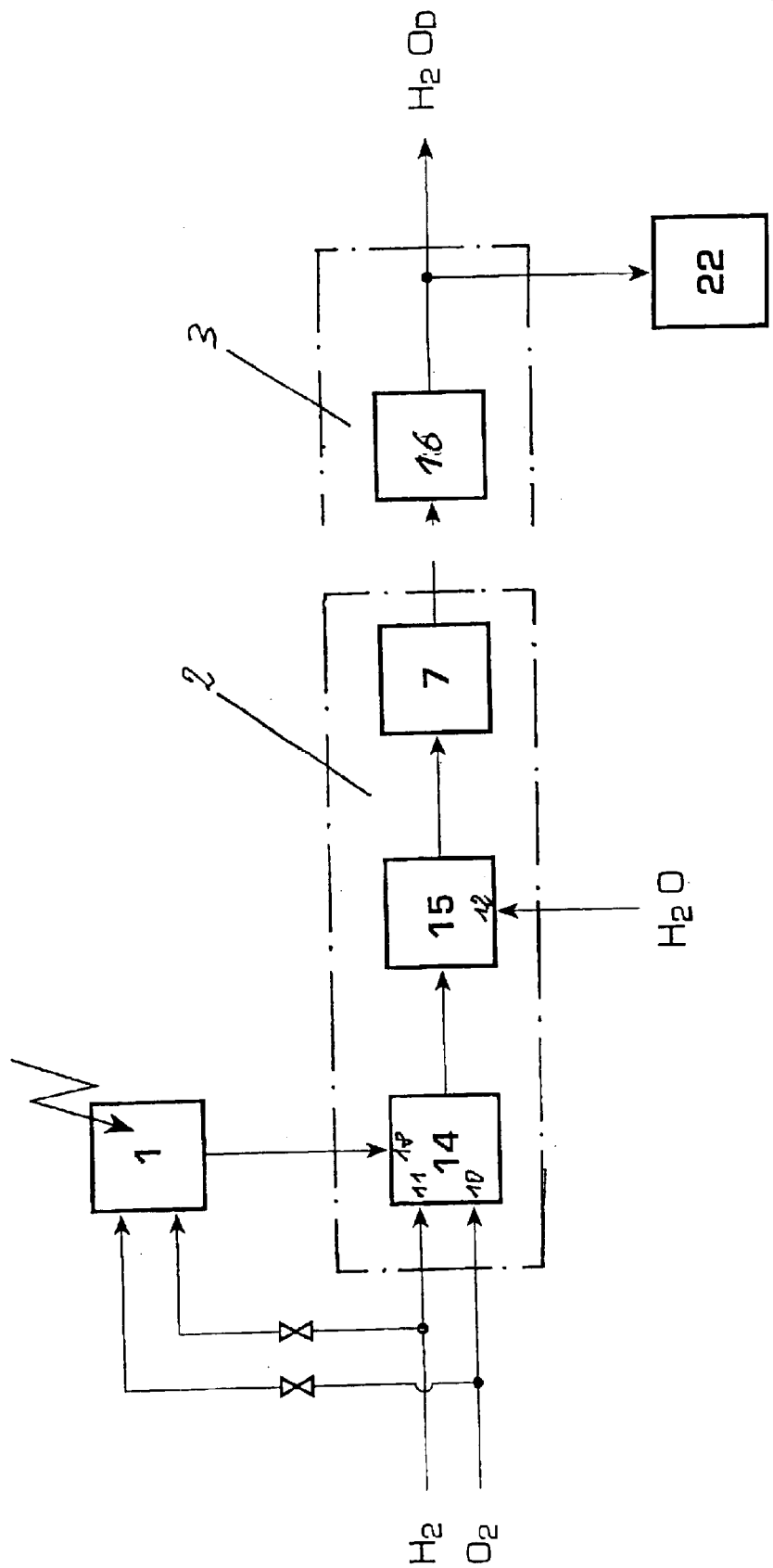
FIG. 3 shows a method block diagram.

The method of operation of a steam generator operated with hydrogen and oxygen for generating ultrapure steam is explained below with reference to FIG. 3.

Steady-state combustion of hydrogen and oxygen to form steam takes place in the reaction zone (14). The combustion temperature which can theoretically be achieved is approximately 3000 K. For cooling purposes, demineralized water is injected, being evaporated and superheated in the process. To increase the purity of the steam, the unreacted constituents of the reaction mixture are subjected to catalytic afterburning.

An oxygen stream (5) and a hydrogen stream (4) are injected in a stoichiometric ratio, in an inner cylindrical flow and an outer annular flow, via the inlet openings (10) and (11), into the upstream region of the combustion and evaporation chamber (2), the reaction zone (14).

To ignite the steam generator, in each case a part-stream of the hydrogen and of the oxygen are passed through the pilot ignition chamber (1), where they are ignited by means of the electrical ignition device (17). The expanding hot reaction gases escape through the lance (18) into the reaction zone (14) of the combustion and evaporation chamber (2), where they ignite the hydrogen/oxygen mixture which has been introduced to form highly heated steam. After the start-up operation has ended, the pilot ignition chamber (1) is switched off.

The highly heated, expanding steam formed in the reaction zone (14) is cooled in the evaporation zone (15) by the injection of a quantity of demineralized water. The ratio of the mass flow of water added to the mass flows of hydrogen and oxygen used results in the temperature of the steam which is generated. The less water is injected, the higher the temperature of the steam which is generated becomes. The quantity of water added is therefore dependent on the demands of the consumer, but also on the active temperature range of the downstream catalytically active structure.

Depending on the residence time, the conversion rate achieved in the reaction zone (14) is approximately 70% to 80%. Accordingly, a mixture of steam with fractions of unreacted hydrogen and oxygen and unevaporated water particles is to be found at the outlet of the evaporation zone (15).

As it leaves the combustion and evaporation chamber (2), this reaction mixture flowing out is accelerated to the speed of sound in the narrowing cross section of flow of the outlet nozzle (7) and is then decelerated again in a number of steps to a flow velocity which is suitable for the catalytic oxidation reaction. The turbulent flow of varying velocity promotes the evaporation of the last water particles and the homogenization of the reaction mixture.

As it continues on its way, the substantially homogenous mixture is passed through the through-flow body (16) which completely covers the cross section of flow and in this case is a foamed metal substrate with a catalytically active surface made from platinum. The remaining proportion of unburnt constituents is virtually completely reacted by contact with the catalytically active surfaces.

It is noticeable that in the process, on account of the exothermic reaction, the steam is superheated once again. Experience has shown that approximately ¾ of the thermal output is produced in the reaction zone (14) of the combustion and evaporation chamber (2), and approximately ¼ of the thermal output is produced by the catalytic afterburning.

The catalytic afterburning chamber (3) leaves an ultrapure steam in a temperature range from 500 K to 2000 K, a pressure range from 1 bar to 30 bar and a steam purity of over 99.9% by weight. The mass flow throughput is likewise very flexible and is substantially dependent on the design selected for the installation.

Temperature, pressure and throughput can be adjusted independently of one another. The installation can be started up and shut down without time delay. The installation can be of very compact design and can therefore be used even where space is tight, for example in a laboratory.

The above explanations relating to an exemplary embodiment are in no way to be understood as employing any form of restriction. On the contrary, they are given for guidance purposes and are to be understood as outlining the varied nature of the inventions within the present scope of protection.

In particular, it is not imperative for the reaction and evaporation chambers to form a common cavity inside a common housing. This is merely an expedient configuration. It is of course conceivable for these method steps to be spatially decoupled and for the reaction and evaporation chambers to be accommodated separately within a common housing or within different housings.

Likewise, it is of course also conceivable for the function of the pilot ignition installation to be implemented inside the reaction chamber without departing from the scope of the invention.

Obviously, numerous modifications and variations of the present invention are possible in light of the above teachings. It is therefore to be understood that within the scope of the appended claims, the invention may be practiced otherwise than specifically described herein.

LIST OF DESIGNATIONS

1 Pilot ignition chamber
2 Combustion and evaporation chamber
3 Afterburning chamber
4 Fuel
5 Oxidizing agent
6 Water
7 Outlet nozzle
8 Combustion chamber housing
9 Coolant passage
10 Inlet opening for oxidizing agent
11 Inlet opening for fuel
12 Inlet opening for water
13 Inner wall of the combustion chamber
14 Reaction zone
15 Evaporation zone
16 Catalytically active through-flow body
17 Spark plug
18 Lance
19 Inert constituents
20 Housing of the afterburning chamber
21 Cross section of flow
22 Gas-analysis device, specifically lambda sensor
23 Removal pipe
24 Pressure-reducing valve
25 Chamber for lambda sensor
26 Cooling medium for afterburning chamber
27 Inlet connection piece for cooling medium
28 Outlet connection piece for cooling medium
29 Coolant passage

What is claimed is:

1. A method for generating steam comprising:
   introducing a fuel and an oxidizing agent in a stoichiometric ratio into a reaction zone;
   exothermically reacting the fuel and oxidizing agent to form hot reaction gases;
   transferring the hot reaction gases into an evaporation zone;
   introducing water in liquid form, vapor form, or both into the evaporation zone, the water which is introduced being evaporated, superheated, or both as it mixes with the hot reaction gases to form a steam-containing reaction mixture;
   catalytically afterburning the steam-containing reaction mixture; and
   flowing the steam-containing reaction mixture through a gas-permeable structure with a catalytically active surface;
   wherein the catalytically active surface comprises platinum.

2. A method for generating steam comprising:
   introducing a fuel and an oxidizing agent in a stoichiometric ratio into a reaction zone;
   exothermically reacting the fuel and oxidizing agent to form hot reaction gases;
   transferring the hot reaction gases into an evaporation zone;
   introducing water in liquid form, vapor form, or both into the evaporation zone, the water which is introduced being evaporated, superheated, or both as it mixes with the hot reaction gases to form a steam-containing reaction mixture; and
   catalytically afterburning the steam-containing reaction mixture; and
   causing the steam-containing reaction mixture to leave the evaporation zone via a throttle point and accelerating the steam-containing reaction mixture.

3. The method as claimed in claim 2, wherein accelerating comprises accelerating the reaction mixture to the speed of sound.

4. A method for generating steam comprising:
   introducing a fuel and an oxidizing agent in a stoichiometric ratio into a reaction zone;
   exothermically reacting the fuel and oxidizing agent to form hot reaction gases;
   transferring the hot reaction gases into an evaporation zone;
   introducing water in liquid form, vapor form, or both into the evaporation zone, the water which is introduced being evaporated, superheated, or both as it mixes with the hot reaction gases to form a steam-containing reaction mixture; and
   catalytically afterburning the steam-containing reaction mixture;
   wherein the oxidizing agent comprises hydrogen peroxide.

5. The method as claimed in claim 4, wherein the fuel comprises natural gas.

6. A method for generating steam comprising:
   introducing a fuel and an oxidizing agent in a stoichiometric ratio into a reaction zone;
   exothermically reacting the fuel and oxidizing agent to form hot reaction gases;
   transferring the hot reaction gases into an evaporation zone;
   introducing water in liquid form, vapor form, or both into the evaporation zone, the water which is introduced being evaporated, superheated, or both as it mixes with the hot reaction gases to form a steam-containing reaction mixture; and catalytically afterburning the steam-containing reaction mixture;

wherein the fuel comprises hydrogen.

7. The method as claimed in claim 6, comprising:

flowing the steam-containing reaction mixture through a gas-permeable structure with a catalytically active surface.

8. The method as claimed in claim 7, wherein the gas-permeable structure comprises a foamed metallic or ceramic material.

9. The method as claimed in claim 6, wherein the oxidizing agent comprises oxygen.

10. A method for generating steam comprising:

introducing a fuel and an oxidizing agent in a stoichiometric ratio into a reaction zone;

exothermically reacting the fuel and oxidizing agent to form hot reaction gases;

transferring the hot reaction gases into an evaporation zone;

introducing water in liquid form, vapor form, or both into the evaporation zone, the water which is introduced being evaporated, superheated, or both as it mixes with the hot reaction gases to form a steam-containing reaction mixture; and catalytically afterburning the steam-containing reaction mixture;

wherein the fuel comprises a hydrocarbon.

11. A method for generating steam comprising:

introducing a fuel and an oxidizing agent in a stoichiometric ratio into a reaction zone;

exothermically reacting the fuel sad oxidizing agent to form hot reaction gases;

transferring the hot reaction gases into an evaporation zone;

introducing water in liquid form, vapor form, or both into the evaporation zone, the water which is introduced being evaporated, superheated, or both as it mixes with the hot reaction gases to form a steam-containing reaction mixture;

catalytically afterburning the steam-containing reaction mixture; and forming a product with a steam content of at least 99.9% by weight, a temperature of up to 2000 K, and a pressure of up to 30 bar.

12. A method for generating steam comprising:

introducing a fuel and an oxidizing agent in a stoichiometric ratio into a reaction zone;

exothermically reacting the fuel and oxidizing agent to form hot reaction gases:

transferring the hot reaction gases into an evaporation zone;

introducing water in liquid form, vapor form, or both into the evaporation zone, the water which is introduced being evaporated, superheated, or both as it mixes with the hot reaction gases to form a steam-containing reaction mixture;

catalytically afterburning the steam-containing reaction mixture; and introducing a steam product as working medium in an energy conversion process which is free of $CO_2$ emissions.

13. A method for generating steam comprising:

introducing a fuel and an oxidizing agent in a stoichiometric ratio into a reaction zone;

exothermically reacting the fuel and oxidizing agent to form hot reaction gases;

transferring the hot reaction gases into an evaporation zone;

introducing water in liquid form, vapor form, or both into the evaporation zone, the water which is introduced being evaporated, superheated, or both as it mixes with the hot reaction gases to form a steam-containing reaction mixture; and catalytically afterburning the steam-containing reaction mixture; and introducing a steam product for treating special waste.

14. A method for generating steam comprising:

a combustion and evaporation chamber having a reaction zone for the exothermic reaction of a fuel and an oxidizing agent, and an evaporation zone for the evaporation, superheating, or both of an injected quantity of water;

a device for feeding the fuel and the oxidizing agent into the reaction zone to form a fuel/oxidizing agent mixture;

an ignition device for igniting at least some of the fuel/oxidizing agent mixture;

a device for feeding water into the evaporation zone, to form a steam-containing reaction mixture;

an outlet nozzle for the steam-containing reaction mixture; and a catalytic afterburning chamber arranged downstream of the reaction and evaporation chamber;

wherein the catalytic afterburning chamber comprises a housing and a through-flow body with a catalytically active surface, a free cross section of flow of the housing being acted on over a region of its axial length by the through-flow body.

15. The steam generator as claimed in claim 14, the afterburning chamber comprises a substantially cylindrical flow passage.

16. The steam generator as claimed in claim 15, wherein the housing comprises a double-casing tube.

17. The steam generator as claimed in claim 16, wherein the housing of the afterburning chamber is air-cooled.

18. The steam generator as claimed in claim 14, wherein the through-flow body comprises a foamed metal material or a foamed ceramic material.

19. The steam generator as claimed in claim 14, wherein the through-flow body comprises a metallic or ceramic honeycomb structure.

20. The steam generator as claimed in claim 14, further comprising a gas-analysis device arranged downstream of the through-flow body.

21. The steam generator as claimed in claim 20, further comprising a lambda sensor arranged inside the flow passage.

22. The steam generator as claimed in claim 20, further comprising:

a removal pipe;

a pressure-relief device;

a chamber including the gas-analysis device;

wherein the housing of the afterburning chamber has a through-opening for the removal pipe, the removal pipe being gas-permeable toward the flow passage; and wherein the removal pipe outside the housing is in communication, via the pressure-relief device, with the chamber including the gas-analysis device.

23. The steam generator as claimed in claim 22, wherein the gas-analysis device comprises a lambda sensor.

* * * * *